Patented Mar. 25, 1941

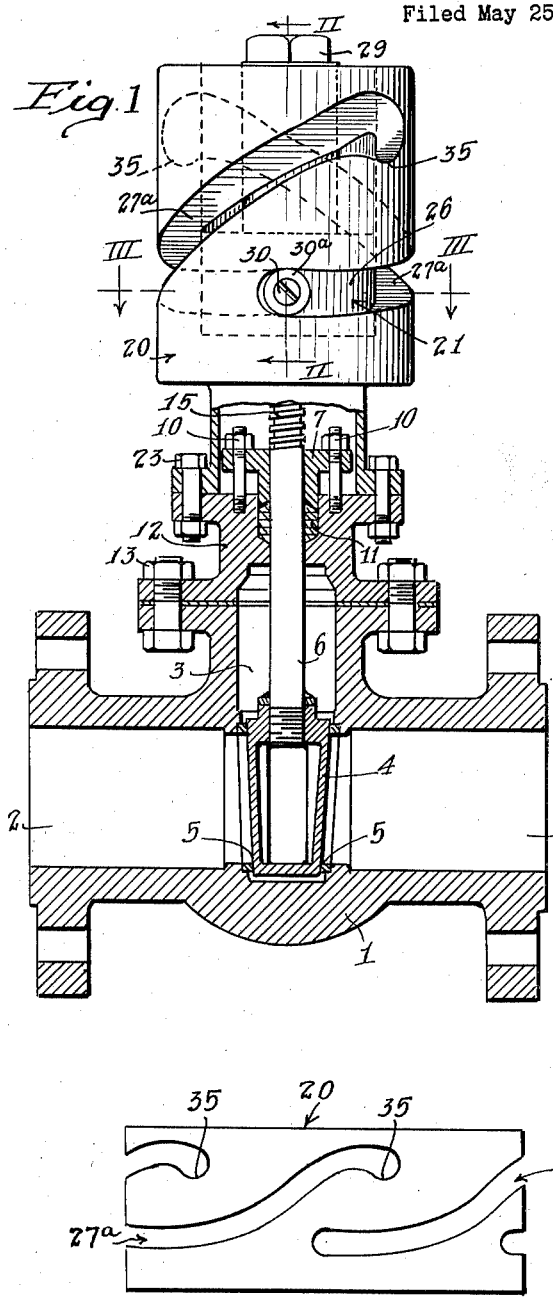
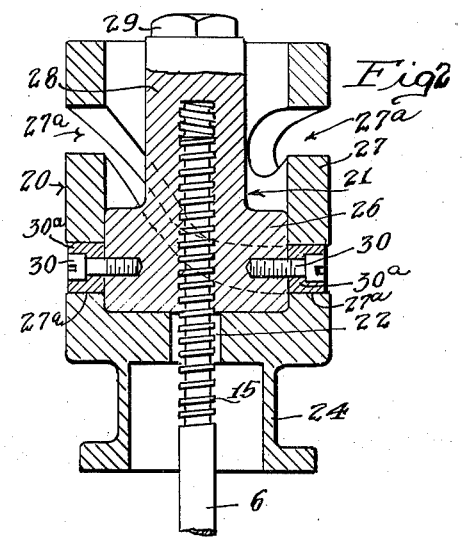
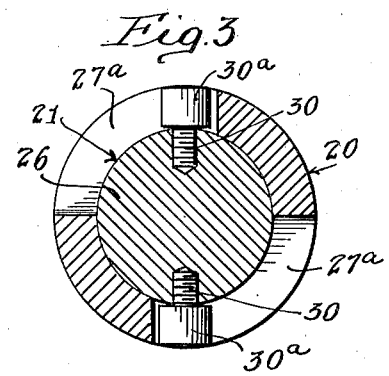
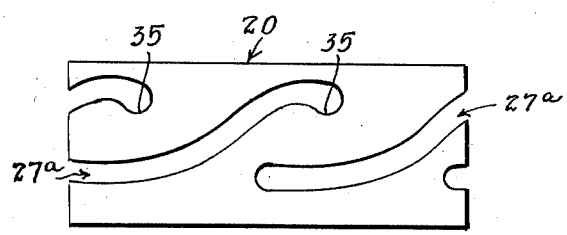

2,235,990

UNITED STATES PATENT OFFICE 2,235,990

VALVE MECHANISM

Charles L. Guttery, Bakersfield, Calif.

Application May 25, 1940, Serial No. 337,237

7 Claims. (Cl. 74—59)

This invention relates to valves, such as gate valves, in which the closure member has to be moved through a substantial distance, but requires little force except during final seating movement and initial unseating movement.

An object of the invention is to provide a practicable and inexpensive apparatus for closing and opening such valves quickly and easily.

A more specific object is to provide a valve gate moving mechanism having a slow, powerful action adjacent the closed position of the valve in order to positively seat the gate, and, at the same time, provide for the rapid movement of the gate after it has been lifted from the seat.

Another object is to provide a mechanism for rapid movement of a valve gate stem and provide a positive lock for the gate in the closed position.

Another object is to provide an operating mechanism for the gate of a valve, having a rotary driving member, means coupling it to the gate for rapid movement of the latter until the gate begins to seat, and then a slow, vertical movement of the stem in response to rotation of the driving member so that the valve may be securely closed and easily opened without applying a high torque to the rotating element.

Still another object is to provide a mechanism for rapidly opening or closing a gate valve that will positively maintain the valve in the open position and prevent its accidental closure as a result of vibration or other accidental causes.

Heretofore it has been customary to move the gate of a gate valve by a screw stem, cooperating with a nut, in order to obtain the relatively powerful forces required to seat and unseat the gate. However such constructions had the serious disadvantage that the vertical movement of the stem bears a fixed ratio to the rotary movement of the nut throughout the entire range of movement of the stem so that the nut must be rotated through a large number of revolutions in order to fully open the valve, despite the fact that the force required to raise the gate after it has been unseated, is very slight. To give an idea of the time required to open and close such valves, it may be stated that the number of revolutions of the nut required to fully open or close the gate may vary from a minimum of ten revolutions, in the case of small valves, up to 40 or 50 revolutions on large valves.

In accordance with the present invention, I provide for the powerful force necessary to seat and unseat the gate while providing for rapid movement of the gate through its intermediate range of movement, by employing a cam mechanism instead of a screw mechanism for actuating the stem. Further, in accordance with the invention, I provide a simple and relatively inexpensive attachment for use on existing valves, whereby the usual nut and handwheel may be eliminated from such valve and my present cam mechanism substituted therefor.

A full understanding of the invention, together with more specific objects and features thereof, may be had from the following detailed description of a specific embodiment thereof, as illustrated in the drawing.

In the drawing:

Fig. 1 is a side elevation view, partly in section, of a gate valve equipped with a mechanism in accordance with my invention;

Fig. 2 is a detail, sectional view taken in the plane II—II of Fig. 1;

Fig. 3 is a horizontal section taken in the plane III—III of Fig. 1; and

Fig. 4 is a development of the cam employed.

Referring, first, to Fig. 1, my invention is shown connected to a conventional gate valve having a body member 1 with a line fluid passage 2 extending therethrough and intercepted by a gate passage 3 through which a gate 4 is adapted to move. The gate 4 is of the tapered type, adapted to seat firmly against seats 5 at the juncture of the line fluid passage 2 with the gate passage 3.

The gate 4 is connected to the lower end of a stem 6 which extends up through a packing gland 7 to the exterior of the valve housing. The packing gland 7 is held down by a pair of bolts 10 to compress a packing 11 in an annular space surrounding the stem and defining a stem guide 12 which is secured to the valve body 1 by bolts 13. The structure so far described is conventional, and does not constitute a part of the present invention.

In accordance with prior practice, the upper end of the stem 6, which projects above the packing gland 7, is provided with screw threads 15 which are adapted to be engaged by an actuating nut rotatably supported in a frame which is usually mounted on the stem guide 12. The nut and supporting frame are not disclosed in the drawing, since they are removed to make way for the present invention.

The present invention comprises, as its essential elements, a stationary cam member 20 and a cooperating rotary follower member 21.

The stationary cam member 20 is in the general form of a hollow cylinder closed at the bottom except for an aperture 22 for the passage of the screw 15, and has formed integrally therewith a downwardly extending frame structure 24 adapted to be bolted by bolts 23 to the stem guide 12 of the valve.

The follower member 21 comprises a solid cylinder 26 dimensioned to be rotatably received within the hollow cylindrical wall 27 of the cam member 20 and having an upwardly extending stem 28 formed at its upper end 29 to receive a wrench. The rotatable member 21 has a threaded hole extending upwardly part way therethrough for threadedly engaging the screw 15 of the valve stem 6.

The cylindrical wall 27 of the cam member 20 is provided with a pair of diametrically opposite curved slots 27a, the edges of which constitute cam surfaces adapted to bear against follower rollers 30a secured by screws 30 to the cylindrical portion 26 of member 21. It will be apparent that in response to rotation of the follower member 21 the rollers 30a traveling in the slots 27a will raise or lower the member 21 and will simultaneously raise or lower the valve stem 6.

As shown in Fig. 1, when the rollers 30a are positioned in the lower ends of the slots 27a, the gate of the valve is fully seated. On the other hand, when the member 21 is rotated counterclockwise to carry the rollers 30a into the upper ends of the slots 27a, the gate 4 will be in fully opened position.

It will be observed from Fig. 4 that the lower end of each slot 27a is very nearly horizontal, but that the slots rise quite steeply through the intermediate portions of their length. This shape imparts a powerful vertical seating or unseating force to the gate in response to only a moderate torque applied to the follower member 21. On the other hand, when the gate 4 is freed from its seat, there is very little resistance to its movement and the steep intermediate portions of the slots 27a lift or lower the gate through a substantial vertical distance in response to rotation of the member 21 through a relatively small angle. In the particular construction shown, rotation of the member 21 through slightly more than half a revolution, functions to move the gate 4 from one extreme position to the other. Obviously, the exact arcuate extent of the slots 27a may be varied, where necessary, to meet the requirements of valves of different sizes.

As shown most clearly in Fig. 4, the upper end of each slot 27a has a recess 35 in its lower wall to eliminate any tendency for the gate 4 to drop back into closed position, the weight of the rotatable assembly, the stem 6 and the gate 4 tending to retain the rollers 30a in the recesses 35.

The rotatable member 21 rotates on the screw 15 during operation, and movement of member 21 in clockwise direction tends to lift the screw 15 as a result of the relative rotation between the member 21 and the screw. However, the slope of the slots 27a near their lower end is made slightly greater than the slope of the threads of screw 15 so that the lowering movement of member 21 in response to clockwise rotation thereof, is greater than the lifting movement applied to the screw 15 by member 21, so that the resultant movement of the stem 6 is always downward in response to clockwise direction of the member 21.

My attachment is easily applied to an existing valve by removing the usual superstructure supporting the nut and handwheel from the valve body. This superstructure is not shown in the drawing, but would be attached to the gland member 7. Then, if the screw portion 15 of the valve stem is too long, a portion thereof is cut off. Next the entire attachment of the present invention is placed on the valve by screwing the member 21 onto the screw 15. With the gate 4 seated and the rollers 30a in the lower ends of the slots 27a, the assembly, including the members 20 and 21, is screwed down onto the screw 15 until the frame member 24 rests on the guide member 12, whereupon the base member 24 is secured to the guide member 12 with the bolt 23.

If at any time it is found that rotation of the member 21 into extreme clockwise position, as shown in Fig. 1, does not fully seat the gate 4, corrective adjustment is made by removing the bolts 23 and rotating the entire assembly, including the frame 24, in counterclockwise direction into a new position, and again placing the bolts 23. Such counterclockwise rotation of the assembly causes the rotatable member 21 to ride upwardly along the screw 15, thereby lowering the stem 6 and the gate 4 with respect to the entire cam mechanism. An annular row of holes for the bolts 23 may be provided in the member 24 and/or the member 12, so that those two members can be bolted together in any of a large number of different rotative positions, to provide for accurate adjustment of the gate 4 in closed position.

As previously indicated, a specific embodiment of the invention has been described in detail for the purpose of explaining the invention, but the invention is to be limited only to the extent set forth in the appended claims.

I claim:

1. An attachment for a gate valve having a valve body, a gate and a screw stem for shifting the gate, said attachment comprising: a stationary body member adapted to be mounted on the valve body in concentric relation with the valve stem, a rotatable member supported by said body member for rotary and axial movement with respect to said valve stem, cooperating cam and cam follower elements on said two respective members for effecting longitudinal movement of said rotatable member in response to rotation thereof, and means for rotatably connecting said rotatable member to the valve stem.

2. An attachment as described in claim 1, in which said body member comprises a hollow cylindrical shell portion, and said rotatable member comprises a cylindrical hub rotatably fitted in said shell.

3. An attachment as described in claim 1, in which said body member comprises a hollow cylindrical shell portion and said rotatable member comprises a cylindrical hub rotatably fitted in said shell, and said cam and cam follower elements comprise an approximately helical cam track on one of said members, and a substantially radially projecting cam follower on the other member.

4. An attachment as described in claim 1, in which said body member comprises a hollow, cylindrical shell, and said rotatable member comprises a cylindrical hub rotatably fitted in said shell and said cam and cam follower elements comprise a plurality of circumferentially symmetrically disposed cam tracks on one of said members, and a plurality of cooperating, circumferentially symmetrically disposed cam followers on the other.

5. An attachment as described in claim 1, in which the means for coupling the rotatable member to the valve stem includes a threaded opening in the member adapted to screw onto the threaded stem.

6. An attachment as described in claim 1, in which the means for coupling the rotatable member to the valve stem includes a threaded opening in the member adapted to screw onto the threaded stem, said cam and cam follower elements functioning to move said rotatable member in seating direction and to move said stem in unseating direction with respect to said rotatable member in response to rotation of the latter in a single direction, the pitch of said cam being greater than the pitch of the thread on the valve stem, whereby seating movement of the rotatable member relative to the valve body is greater than unseating movement of the valve stem relative to the rotatable member.

7. In combination in a valve, a valve body having a seat and a closure member mounted for lineal movement into and out of seating relation, a screw stem for shifting said movable valve body, said stem extending exterior of said valve body, a rotatable member coaxial with and secured to said stem, and means for rotatably supporting said rotatable member, and cooperating cam and cam follower elements on said rotatable member and said supporting means therefor, for effecting longitudinal movement of said rotatable member in response to rotation thereof.

CHARLES L. GUTTERY.